United States Patent
Hirose et al.

(10) Patent No.: US 10,475,577 B2
(45) Date of Patent: Nov. 12, 2019

(54) DIELECTRIC COMPOSITION, DIELECTRIC ELEMENT, ELECTRONIC COMPONENT AND MULTI-LAYER ELECTRONIC COMPONENT

(71) Applicant: EPCOS AG, München (DE)

(72) Inventors: Masakazu Hirose, Tokyo (JP); Goushi Tauchi, Tokyo (JP); Tomoya Imura, Tokyo (JP); Tomohiro Terada, Tokyo (JP)

(73) Assignee: TDK ELECTRONICS AG, München (DE)

( * ) Notice: Subject to any disclaimer, the term of this patent is extended or adjusted under 35 U.S.C. 154(b) by 0 days.

(21) Appl. No.: 15/745,688

(22) PCT Filed: Jun. 16, 2016

(86) PCT No.: PCT/EP2016/063865
§ 371 (c)(1),
(2) Date: Jan. 17, 2018

(87) PCT Pub. No.: WO2017/012793
PCT Pub. Date: Jan. 26, 2017

(65) Prior Publication Data
US 2018/0211780 A1 Jul. 26, 2018

(30) Foreign Application Priority Data

Jul. 17, 2015 (JP) ................. 2015-143372

(51) Int. Cl.
*C04B 35/475* (2006.01)
*H01G 4/12* (2006.01)
(Continued)

(52) U.S. Cl.
CPC ......... *H01G 4/1227* (2013.01); *C04B 35/462* (2013.01); *C04B 35/47* (2013.01);
(Continued)

(58) Field of Classification Search
CPC .... C04B 35/47; C04B 35/475; H01G 4/1218; H01G 4/1227
See application file for complete search history.

(56) References Cited

U.S. PATENT DOCUMENTS 6,292,354 B1   9/2001  Kobayashi et al.
6,656,865 B2 * 12/2003  Saito ................... C04B 35/468
                                                            361/321.2
(Continued)

FOREIGN PATENT DOCUMENTS

JP   2001015374 A   1/2001
JP   2002080276 A   3/2002
(Continued)

OTHER PUBLICATIONS

Vintila, R. et al., "Effect of A-Site Substitutions on the Microstructure and Dielectric Properties of Bismuth Sodium Titanate-Based Ceramics Exhibiting Morphotropic Phase Boundary," Advances in Electronic Ceramic Materials, vol. 26, No. 5, Jan. 23-28, 2005, 8 pages.

*Primary Examiner* — Karl E Group
(74) *Attorney, Agent, or Firm* — Slater Matsil, LLP

(57) ABSTRACT

A dielectric composition, a dielectric element, an electronic component and a multi-layer electronic component are disclosed. In an embodiment the dielectric composition includes a perovskite crystal structure containing at least Bi, Na, Sr and Ti, wherein the dielectric composition includes at least one selected from among La, Ce, Pr, Nd, Sm, Eu, Gd, Tb, Dy, Ho, Yb, Ba, Ca, Mg and Zn, wherein the dielectric composition includes specific particles having a core-shell structure that has at least one core portion including $SrTiO_3$ and wherein $\alpha$ is set to $0.20 \le \alpha \le 0.70$, where $\alpha$ is the ratio of the number of specific particles with respect to the total number of particles contained in the dielectric composition.

13 Claims, 3 Drawing Sheets

(51) Int. Cl.
   *C04B 35/462*   (2006.01)
   *C04B 35/47*    (2006.01)
   *H01G 4/30*     (2006.01)
   *C04B 35/626*   (2006.01)
   *C04B 35/628*   (2006.01)
   *C04B 35/634*   (2006.01)
   *C04B 35/64*    (2006.01)
   *H01G 4/012*    (2006.01)

(52) U.S. Cl.
   CPC ........ *C04B 35/475* (2013.01); *C04B 35/6262* (2013.01); *C04B 35/62645* (2013.01); *C04B 35/62821* (2013.01); *C04B 35/63416* (2013.01); *C04B 35/64* (2013.01); *H01G 4/012* (2013.01); *H01G 4/1218* (2013.01); *H01G 4/30* (2013.01); *C04B 2235/3201* (2013.01); *C04B 2235/3206* (2013.01); *C04B 2235/3208* (2013.01); *C04B 2235/3213* (2013.01); *C04B 2235/3215* (2013.01); *C04B 2235/3224* (2013.01); *C04B 2235/3227* (2013.01); *C04B 2235/3229* (2013.01); *C04B 2235/3236* (2013.01); *C04B 2235/3284* (2013.01); *C04B 2235/3298* (2013.01); *C04B 2235/5445* (2013.01); *C04B 2235/604* (2013.01); *C04B 2235/656* (2013.01); *C04B 2235/768* (2013.01); *C04B 2235/77* (2013.01); *C04B 2235/80* (2013.01)

(56) References Cited

U.S. PATENT DOCUMENTS

| | | | |
|---|---|---|---|
| 7,744,954 B2* | 6/2010 | Fujikawa | C04B 35/4682 |
| | | | 427/212 |
| 9,105,407 B2* | 8/2015 | Morita | H01G 4/12 |
| 2006/0216512 A1 | 9/2006 | Fujikawa et al. | |
| 2014/0285950 A1 | 9/2014 | Morita et al. | |
| 2018/0211778 A1* | 7/2018 | Tauchi | C04B 35/462 |
| 2018/0211780 A1* | 7/2018 | Hirose | H01G 4/012 |

FOREIGN PATENT DOCUMENTS

| | | |
|---|---|---|
| JP | 2005022891 A | 1/2005 |
| JP | 2006298746 A | 11/2006 |
| JP | 2009096671 A | 5/2009 |

\* cited by examiner

DIELECTRIC COMPOSITION, DIELECTRIC ELEMENT, ELECTRONIC COMPONENT AND MULTI-LAYER ELECTRONIC COMPONENT

This patent application is a national phase filing under section 371 of PCT/EP2016/063865, filed Jun. 16, 2016, which claims the priority of Japanese patent application 2015-143372, filed Jul. 17, 2015, each of which is incorporated herein by reference in its entirety.

TECHNICAL FIELD

The present invention relates to a dielectric composition and a dielectric element comprising the same, and to an electronic component and a laminated electronic component; more specifically, the present invention relates to a dielectric composition, a dielectric element, an electronic component and a laminated electronic component which are used for applications with a relatively high rated voltage.

BACKGROUND

Recent years have seen increasing demand for miniaturization and increased reliability of dielectric elements as electronic circuits reach higher densities, and miniaturization of electronic components such as laminated ceramic capacitors, together with increased capacity and higher reliability are rapidly progressing, while the applications thereof are also expanding. Various characteristics are required as this happens. Materials comprising barium titanate ($BaTiO_3$) as the main component are often used conventionally as dielectric compositions for such applications.

For example, a smoothing capacitor or a snubber capacitor such as a motor vehicle DC-DC converter or AC-DC inverter is often used in a location in which a high DC bias of several hundred volts is applied. Dielectric elements used in these electronic components therefore must have a high dielectric constant when a high DC bias is applied. In addition, if the dielectric material has low mechanical strength, there is a risk of cracking or splintering etc. during production or during mounting on a substrate, and thus a risk of a product being non-conforming; high mechanical strength is also required at the same time.

There is therefore a problem with conventional electronic components having a dielectric layer comprising a dielectric composition which has $BaTiO_3$ as the main component in that there is a reduction in dielectric constant when a high DC bias is applied. This problem is due to the fact that $BaTiO_3$ is a ferroelectric material, which makes the problem difficult to avoid when $BaTiO_3$ is used as the main component. When electronic components having a dielectric layer comprising a dielectric composition which has $BaTiO_3$ as the main component are used for applications involving high DC bias application it is therefore necessary to devise a method for using such electronic components. According to one example of a known method, the amount of reduction in the dielectric constant is anticipated and a plurality of the electronic components is connected in parallel for use in order to maintain the required capacitance or dielectric constant.

Furthermore, when a conventional dielectric composition having $BaTiO_3$ as the main component is used for applications under a low DC bias of several volts or less, the field intensity applied to the dielectric layers is small, so it is possible to adopt a design in which the dielectric layers are sufficiently thin and the electrode surface area is sufficiently small that breakdown does not occur. That is to say, the dielectric material can be made more compact and more lightweight. The required mechanical strength is also reduced if the dielectric material is smaller and more lightweight. For example, there is essentially no cracking or splintering even if the dielectric material is dropped during production because it is possible to maintain adequate mechanical strength which is commensurate with the size and weight of the dielectric material. However, when a conventional dielectric composition having $BaTiO_3$ as the main component is used under a high DC bias of several hundred volts or greater, the dielectric layers must be sufficiently thick to ensure safety with respect to breakdown. As a result, it is necessary to increase the electrode surface area in order to maintain the required capacitance. That is to say, the dielectric material tends to become larger and heavier. As a result, the required mechanical strength also increases. The dielectric material may crack or splinter if it is dropped during production because it is not possible to ensure adequate mechanical strength which is commensurate with the size and weight of the dielectric material.

In order to solve these problems, Japanese Patent Application JP 2006-206362 A mentioned below describes a dielectric porcelain having barium titanate as the main component and containing Ca, Sr, Mg, Mn and rare earth elements, and characterized by a core-shell structure in which the Ca concentration is greater at the particle surface than at the centre of the particle, and the Sr, Mg, Mn and rare earth elements are unevenly distributed at the particle surface.

Furthermore, Japanese Patent Application JP 2005-22891 A mentioned below describes a dielectric porcelain characterized in that it comprises both perovskite barium titanate crystal grains in which part of the B site is substituted with Zr (BTZ-type crystal grains), and perovskite bismuth sodium titanate crystal grains in which part of the A-site is substituted with Sr (BNST-type crystal grains), and also characterized by a core-shell structure in which Mg, Mn and at least one rare earth element are present in the grain boundary phase between the BTZ-type crystal grains and the BNST-type crystal grains, and the mean particle size of both the BTZ-type crystal grains and the BNST-type crystal grains is 0.3-1.0 μm.

However, although a dielectric porcelain comprising $BaTiO_3$ as the main component and having a core-shell structure such as that described in Japanese Patent Application JP 2006-206362 A has a relatively high dielectric constant value of 2500 or greater at 20° C. when a DC bias is not applied, the rate of change in the dielectric constant or the rate of change in capacitance (DC bias characteristics) when a DC bias of 5 V/μm is applied is a value less than −70%, so the rate of change is large and the value cannot be considered adequate for a capacitor which is used under a high voltage. Furthermore, there is no mention of the mechanical strength.

Meanwhile, a major feature of a ceramic composition such as that described in Japanese Patent Application JP 2005-22891 A lies in the fact that both BTZ-type crystal grains and BNST-type crystal grains having a core-shell structure are present. Furthermore, the BTZ-type crystal grains and the BNST-type crystal grains are both formed with a core-shell structure in which at least one of Mg, Mn and a rare earth metal is more unevenly distributed at the particle surface than at the centre of the particle, and as a result the dielectric constant at 20° C. when a DC bias is not applied achieves a relatively high value of 2750 or greater, and the DC bias characteristics when a DC bias of 3 V/μm is applied achieve a value of less than −20%, but this value cannot be considered sufficient for use under a high voltage, such as in a smoothing capacitor or a snubber capacitor such as a motor vehicle DC-DC converter or AC-DC inverter. Furthermore, there is no mention of the mechanical strength.

SUMMARY OF THE INVENTION

Embodiments of the present invention provide a dielectric composition which can be used in locations where a high voltage is applied, which has an excellent dielectric constant when a DC bias is applied, excellent DC bias characteristics, and also has excellent mechanical strength. Embodiments of the present invention further provide a dielectric element comprising the dielectric composition, an electronic component and a laminated electronic component.

Embodiments of the present invention provide a dielectric composition having a perovskite crystal structure containing at least Bi, Na, Sr and Ti, wherein: the dielectric composition comprises at least one selected from among La, Ce, Pr, Nd, Sm, Eu, Gd, Tb, Dy, Ho, Yb, Ba, Ca, Mg and Zn; the dielectric composition comprises specific particles having a core-shell structure that has at least one core portion including $SrTiO_3$; and $0.20 \leq \alpha \leq 0.70$, where $\alpha$ is the ratio of the number of specific particles with respect to the total number of particles contained in the dielectric composition.

In various embodiments, $\alpha$ can be set to $0.20 \leq \alpha \leq 0.70$, where $\alpha$ is the ratio of the number of specific particles with respect to the total number of particles contained in the dielectric composition. It is possible to improve the dielectric constant when a DC bias is applied, and also to improve the DC bias characteristics and mechanical strength.

In various further embodiments, the content of at the least one selected from among La, Ce, Pr, Nd, Sm, Eu, Gd, Tb, Dy, Ho, Yb, Ba, Ca, Mg and Zn is preferably between 0.2 and 14.3 molar parts, taking the Ti content of the dielectric composition as 100 molar parts. This makes it possible to further improve the dielectric constant when a DC bias is applied, and the DC bias characteristics.

In yet other embodiments $\beta$ can be set to $0.92 \leq \beta \leq 3.00$, where $\beta$ is the molar ratio of Sr with respect to Na in the dielectric composition. This makes it possible to further improve the dielectric constant when a DC bias is applied, the DC bias characteristics and the mechanical strength.

A dielectric element according to embodiments of the present invention is provided with the abovementioned dielectric composition.

An electronic component according to embodiments of the present invention is provided with a dielectric layer comprising the abovementioned dielectric composition.

A laminated electronic component according to embodiments of the present invention has a laminated portion formed by alternately laminating an internal electrode layer and a dielectric layer comprising the abovementioned dielectric composition.

Preferred embodiments of the present invention will be described below with reference to the figures. It should be noted that the present invention is not limited to the following disclosed embodiments. Furthermore, the constituent elements described below include elements which can be readily envisaged by a person skilled in the art and also elements which are substantially the same. In addition, the constituent elements described below may be combined, as appropriate.

DETAILED DESCRIPTION OF ILLUSTRATIVE EMBODIMENTS

Figure 1:
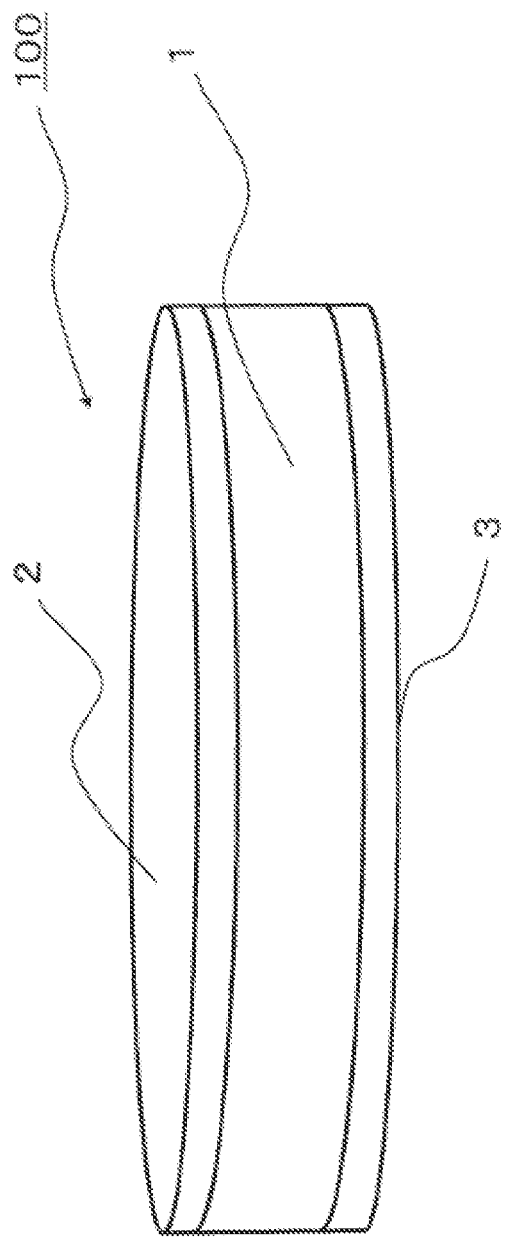
FIG. 1 is a schematic diagram of a ceramic capacitor according to an embodiment of the present invention.

FIG. 1 is a schematic diagram of a single-layer ceramic capacitor according to an embodiment of the present invention.

As shown in FIG. 1, a single-layer ceramic capacitor 100 according to an embodiment of the present invention comprises a disc-shaped dielectric body 1 and a pair of electrodes 2, 3. The single-layer ceramic capacitor 100 is obtained by forming the electrodes 2, 3 on both surfaces of the dielectric body 1. There is no particular limitation as to the shapes of the dielectric body 1 and the electrodes 2, 3. Furthermore, there is no particular limitation as to the dimensions thereof either, and suitable dimensions should be set in accordance with the application.

The dielectric body 1 comprises a dielectric composition according to this embodiment. There is no particular limitation as to the material of the electrodes 2, 3. For example, Ag, Au, Cu, Pt, Ni or the like may be used, but other metals may also be used.

Figure 2:
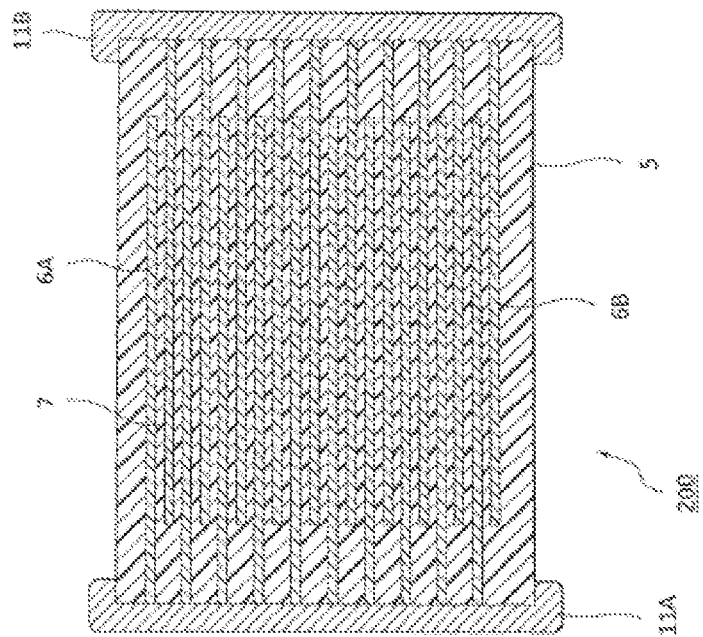
FIG. 2 is a view in cross section of a laminated ceramic capacitor according to a different embodiment of the present invention.

FIG. 2 is a schematic cross-sectional diagram of a laminated ceramic capacitor according to a different embodiment of the present invention.

As shown in FIG. 2, a laminated ceramic capacitor 200 according to a different embodiment of the present invention comprises a capacitor element main body 5 having a structure in which dielectric layers 7 and internal electrode layers 6A, 6B are alternately stacked. A pair of terminal electrodes 11A, 11B which conduct, respectively, with the internal electrode layers 6A, 6B alternately arranged inside the element main body 5 are formed at both ends of the element main body 5. There is no particular limitation as to the shape of the element main body 5, but it is normally a cuboid shape. Furthermore, there is no particular limitation as to the dimensions thereof, and suitable dimensions should be set in accordance with the application.

The internal electrode layers 6A, 6B are provided in such a way as to be parallel. The internal electrode layers 6A are formed in such a way that one end thereof is exposed at the end surface of the laminated body 5 where the terminal electrode 11A is formed. Furthermore, the internal electrode layers 6B are formed in such a way that one end thereof is exposed at the end surface of the laminated body 5 where the terminal electrode 11B is formed. In addition, the internal electrode layers 6A and internal electrode layers 6B are disposed in such a way that the majority thereof is overlapping in the direction of stacking.

There is no particular limitation as to the material of the internal electrode layers 6A, 6B. For example, a metal such as Au, Pt, Ag, Ag—Pd alloy, Cu or Ni etc. may be used, but it is also possible to use other metals.

The terminal electrodes 11A, 11B are provided at the end surfaces of the laminated body 5 in contact with the ends of the internal electrode layers 6A, 6B which are exposed at said end surfaces. By virtue of this structure, the terminal electrodes 11A, 11B are electrically connected to the internal electrode layers 6A, 6B, respectively. The terminal electrodes 11A, 11B may comprise a conductive material having Ag, Au, Cu or the like as the main component thereof. There is no particular limitation as to the thickness of the terminal electrodes 11A, 11B. The thickness thereof is appropriately set in accordance with the application and the size of the laminated dielectric element, among other things. The thickness of the terminal electrodes 11A, 11B may be set at 10-50 µm, for example.

The dielectric layers 7 comprise the dielectric composition according to this embodiment. The thickness of each dielectric layer 7 may be freely set and there is no particular limitation. The thickness may be set at 1-100 µm, for example.

Here, the dielectric composition according to this embodiment has a perovskite crystal structure containing at least Bi, Na, Sr and Ti, and comprises at least one selected from among La, Ce, Pr, Nd, Sm, Eu, Gd, Tb, Dy, Ho, Yb, Ba, Ca, Mg and Zn (also referred to below as an "auxiliary component").

The dielectric composition having a perovskite crystal structure is a polycrystalline material comprising, as the main phase, a perovskite compound represented by the general formula $ABO_3$, where A includes at least one selected from Bi, Na and Sr, and B includes at least Ti.

If the whole of A is taken as 100 at. %, the proportion of Bi, Na, Sr contained in A is preferably a total of at least 80 at. %. Furthermore, if the whole of B is taken as 100 at. %, the proportion of Ti contained in B is preferably at least 80 at. %.

Figure 3:
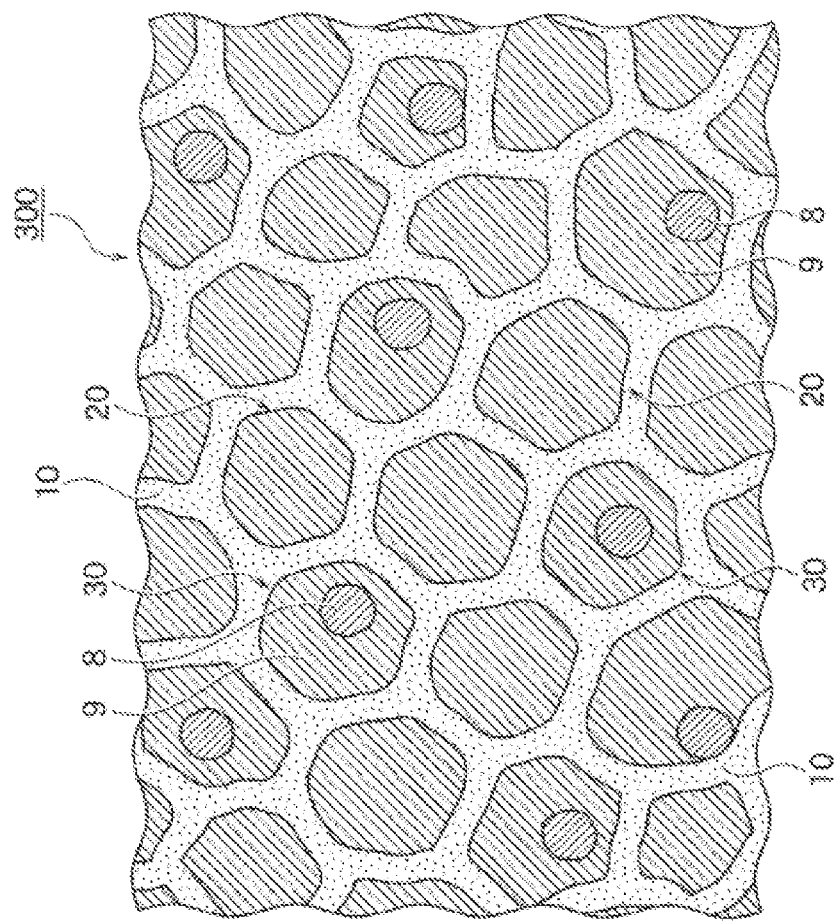
FIG. 3 is a schematic diagram of particles in a dielectric composition according to an embodiment of the present invention.

FIG. 3 is a schematic diagram of particles in a dielectric composition 300 according to this embodiment. The dielectric composition 300 according to this embodiment comprises single-phase particles 20 which do not have a core-shell structure, and core-shell particles 30 which have a core-shell structure.

Furthermore, there is no particular limitation as to the mean particle size of the single-phase particles 20 and the core-shell particles 30. The mean particle size is preferably between 0.3 µm and 3.0 µm from the point of view of improving the denseness of the sintered compact.

A grain boundary 10 is present between particles. The core-shell particles comprise a shell portion 9 surrounding a core portion 8, and there are forms of particles in which the core portion 8 is completely contained within the shell portion 9, and in which part of the core portion 8 is in contact with the grain boundary 10 while another part of the core portion 8 is contained within the shell portion 9.

In addition, the majority of the core-shell particles 30 in the dielectric composition 300 according to this embodiment are specific particles having a core-shell structure that has a core portion including $SrTiO_3$.

The core portion including $SrTiO_3$ has a $SrTiO_3$ crystal structure and contains at least 40 at. % of each of Sr atoms and Ti atoms, where the total of the metal atoms contained in the core portion is taken as 100 at. %.

Furthermore, there is no particular limitation as to the size or shape of the core portion including $SrTiO_3$. The diameter of the core portion including $SrTiO_3$ is preferably no greater than half the mean particle size of the particles contained in the dielectric composition 300. By setting the size of the core portion including $SrTiO_3$ in the abovementioned range, the dielectric constant and the DC bias characteristics are likely to be improved at the same time. Although $SrTiO_3$ tends to improve the DC bias characteristics and mechanical strength, it does also tend to reduce the dielectric constant.

In addition, one core portion including $SrTiO_3$ is normally present within a single particle, but two or more core portions may equally be present.

Here, the shell portion 9 of the specific particles preferably contains at least Na, Bi and Ti.

A method for determining whether or not particles contained in the dielectric composition 300 according to this embodiment are specific particles, and a method for calculating the ratio α of the number of specific particles with respect to the total number of particles contained in the dielectric composition 300 will be described below.

There is no particular limitation as to the method for distinguishing whether or not said particles are core-shell particles 30. In addition, there is no particular limitation as to the method for determining whether or not the core portion 8 of the core-shell particles 30 includes $SrTiO_3$. For example, it is possible to distinguish whether said particles are single-phase particles 20 or core-shell particles 30 by subjecting a cross section cut on any plane of the dielectric composition 300 to scanning transmission electron microscopy (STEM) and energy dispersive X-ray spectroscopy (EDS), and confirming the element distribution. In addition, it is also possible to determine whether or not the core portion 8 of the core-shell particles 30 includes $SrTiO_3$.

There is no particular limitation as to the method for setting the observation field for STEM and EDS, but the size of the observation field is preferably at least 2 m× at least 2 m, and the magnification of the observation field is preferably between 10 000 times and 100 000 times.

A plurality of particles which can be confirmed as being completely surrounded by the grain boundary 10 are selected from the observation field, and the number of core-shell particles among these having a core portion including $SrTiO_3$ (specific particles) is counted. It is possible to calculate the value of a by dividing the number of specific particles by the number of selected particles. It should be noted that at least 20 particles are selected and preferably at least 100 particles are selected. Furthermore, the number of particles selected may be increased by setting a plurality of observation fields.

It should be noted that the amount of core-shell particles 30 produced may be controlled, as appropriate, by varying the make-up of the dielectric composition and the method for producing same, and also by varying the baking conditions when the dielectric composition is baked. For example, when a starting material powder having a large particle size is used, core-shell particles 30 tend to be readily produced. Furthermore, when the baking temperature is increased, core-shell particles 30 tend to be unlikely to be produced.

The dielectric composition 300 according to this embodiment may equally include particles other than the specific particles and the single-phase particles 20, i.e., it may include core-shell particles other than the specific particles. Here, the ratio of the total number of specific particles and single-phase particles 20 with respect to the total number of particles contained in the dielectric composition 300 according to embodiments of the present invention is preferably 80% or greater.

According to this embodiment, the ratio α of the number of specific particles with respect to the total number of particles contained in the dielectric composition 300 satisfies $0.20 \leq \alpha \leq 0.70$.

As a result of setting $0.20\alpha \leq 0.70$ in the dielectric composition 300 according to this embodiment, it is possible to improve the dielectric constant when a DC bias is applied, the DC bias characteristics and the mechanical strength.

On the other hand, if the ratio α of the number of specific particles with respect to the total number of particles does not satisfy 0.20≤α≤0.70, there is deterioration in the dielectric constant when a DC bias is applied and/or the DC bias characteristics and/or the mechanical strength.

The reason for which the dielectric constant when a DC bias is applied and the DC bias characteristics are improved if α≥0.20 is unclear, but the present inventors believe the reason to be as follows. Firstly, $SrTiO_3$ is a paraelectric at room temperature. A feature of paraelectrics is that they are generally affected by a DC bias. The core-shell particles in which the core portion includes $SrTiO_3$ which is a paraelectric at room temperature are present in a constant proportion, and as a result a reduction in dielectric constant in the core-shell particles when a DC bias is applied is limited and therefore the DC bias characteristics of the dielectric body as a whole are improved.

Furthermore, the reason for which the mechanical strength is improved if α≥0.20 is unclear, but the present inventors believe the reason to be as follows. Firstly, $SrTiO_3$ crystals generally have a feature of high mechanical strength. The core-shell particles in which the core portion includes $SrTiO_3$ crystals having high mechanical strength are present in a constant proportion, and as a result the mechanical strength of the core-shell particles improved and therefore the mechanical strength of the dielectric body as a whole is improved.

It should be noted that if α>0.70, the dielectric constant when a DC bias is not applied decreases, and there is also a simultaneous reduction in the dielectric constant when a DC bias is applied.

The dielectric composition 300 according to this embodiment is preferably such that α satisfies 0.25≤α≤0.66.

The dielectric composition 300 according to this embodiment is preferably such that 0.92≤β≤3.00, where β is the molar ratio of Sr with respect to Na in the dielectric composition. The dielectric constant when a DC bias is applied, DC bias characteristics and mechanical strength are further improved when 0.92≤β≤3.00.

Furthermore, there is no particular limitation as to the content of the auxiliary component, but an auxiliary component must be included. If an auxiliary component is not included, there is deterioration in the DC bias characteristics and/or mechanical strength.

Furthermore, the content of the auxiliary component is preferably a total of between 0.2 molar parts and 14.3 molar parts when the Ti content of the dielectric composition is taken as 100 molar parts. By setting the content of the auxiliary component in this range, it is possible to further improve the dielectric constant when a DC bias is applied and the DC bias characteristics. It should be noted that the auxiliary component may be present at any location in the particles and the grain boundary.

In light of the above, the dielectric composition according to this embodiment has as an excellent dielectric constant when a DC bias is applied, excellent DC bias characteristics and excellent mechanical strength overall.

An example of a method for producing the ceramic capacitor 100 shown in FIG. 1 will be described next.

First of all, it is possible to use an oxide of a metal element forming part of the dielectric composition, or a mixture thereof or a composite oxide as the starting material of the dielectric body 1, but the dielectric starting material may also be appropriately selected from various types of compounds which form the abovementioned oxides or composite oxides as a result of baking, e.g., carbonates, oxalates, nitrates, hydroxides and organometallic compounds etc. and these may be mixed for use.

For example, the following powders may be cited as starting materials: bismuth oxide ($Bi_2O_3$), sodium carbonate ($Na_2CO_3$), strontium carbonate ($SrCO_3$), barium carbonate ($BaCO_3$), calcium carbonate ($CaCO_3$), lanthanum hydroxide ($La(OH)_3$), magnesium carbonate ($MgCO_3$) and titanium dioxide ($TiO_2$), among others.

Furthermore, there is no particular limitation as to the particle size of the unprocessed starting material powder (referred to below as the "starting material powder"), but a particle size of 0.1 μm-1.0 μm is preferred. Furthermore, the mean particle size of the starting material may be adjusted by appropriately varying the time for which the starting material is mixed.

Here, the fineness of the starting material powder is affected by the magnitude of a. The smaller the particle size of the starting material powder, the lower a tends to be.

The abovementioned starting material powders are weighed out in such a way that the dielectric compositions after baking (sintered compacts) satisfy the make-up of the dielectric composition according to this embodiment.

The weighed starting material powders are then wet-mixed using a ball mill or the like. The mixtures obtained by wet mixing are then calcined to produce calcined material. Here, the calcining is carried out under normal air. Furthermore, the calcining temperature is preferably 700-900° C. and the calcining time is preferably 1-10 hours.

The resulting calcined material is then wet-ground using a ball mill or the like, after which it is dried to obtain calcined powders. A binder is then added to the resulting calcined powder and the material is press-moulded to obtain a moulded article. There is no particular limitation as to the binder which can be used, provided that it is a binder which is conventionally used in this technical field. Polyvinyl alcohol (PVA) or the like may be cited as a specific example of a binder. There is no particular limitation as to the amount of binder added, but an amount of 1-5 wt % is preferably added when the calcined powder is taken as 100 wt %. There is no particular limitation as to the moulding pressure during press-moulding, but a pressure of the order of 300 MPa is preferred. There is no particular limitation as to the shape of the moulded article. A disc-shape is employed in this embodiment, but a square-plate shape or other shape is equally feasible.

The dielectric body 1 is obtained by baking the resulting moulded article. The baking is normally carried out under the air. Furthermore, the baking temperature is preferably 950-1400° C. and the baking time is preferably 2-10 hours.

Here, it is possible to vary the value of α by appropriately selecting the baking conditions. The higher the baking temperature, the lower the value of α tends to be. Furthermore, the longer the baking time, the lower the value of α tends to be.

The electrodes 2, 3 are then formed on both surfaces of the resulting dielectric body 1. There is no particular limitation as to the material of the electrodes, and Ag, Au, Cu, Pt, Ni or the like may be used. The method for forming the electrodes involves vapour deposition, sputtering, printing, electroless plating or the like, but a method other than these may be used and there is no particular limitation as to the method for forming the electrodes. The ceramic capacitor 100 shown in FIG. 1 may be produced by the method described above.

Furthermore, the laminated ceramic capacitor 200 shown in FIG. 2 may be produced by a conventional method for producing a laminated ceramic capacitor.

A description has been given above of the single-layer ceramic capacitor 100 and the laminated ceramic capacitor 200 according to this embodiment. The dielectric composition according to this embodiment has a high dielectric constant when a high DC bias is applied, and also has excellent DC bias characteristics and mechanical strength. The dielectric composition can therefore be advantageously used in medium- and high-voltage capacitors with a relatively high rated voltage, for example.

The dielectric element, electronic component and laminated electronic component according to embodiments of the present invention can be advantageously used in locations where a relatively high rated voltage is applied. For example, they may be advantageously used in locations in which a high dielectric constant is required when a high DC bias is applied, that is to say, in locations in which a high voltage is applied such as a snubber capacitor for circuit protection, a smoothing capacitor, a DC-DC converter, or an AC-DC inverter.

In addition, the dielectric composition according to embodiments of the present invention does not contain lead. The inventive dielectric composition, dielectric element, electronic component and laminated electronic component are therefore also superior from an environmental point of view.

Embodiments of the present invention will be described below in further detail with the aid of exemplary embodiments and comparative examples. However, the present invention is not limited by the following exemplary embodiments. It should be noted that according to embodiments of the present invention, the DC (direct current) field applied to the dielectric composition, dielectric element, electronic component and laminated electronic component is referred to as a DC bias. Furthermore, the rate of change in the capacitance before and after application of the DC bias is referred to as the DC bias characteristics. The smaller the rate of change in the capacitance, the better the DC bias characteristics.

Exemplary Embodiments 1-23 and Comparative Examples 1-10

Starting material powders of the following materials were prepared: bismuth oxide ($Bi_2O_3$), sodium carbonate ($Na_2CO_3$), strontium carbonate ($SrCO_3$), barium carbonate ($BaCO_3$), calcium carbonate ($CaCO_3$), magnesium carbonate ($MgCO_3$), zinc oxide (ZnO), lanthanum hydroxide ($La(OH)_3$), neodymium oxide ($Nd_2O_3$), samarium oxide ($Sm_2O_3$), gadolinium oxide ($Gd_2O_3$) and titanium oxide ($TiO_2$). Here, the mean particle size of the starting material powders were appropriately adjusted in the range of 0.1-1.0 μm and α in the dielectric composition samples had the values shown in table 1.

The abovementioned starting material powders were weighed out in such a way that the baked dielectric composition contained Sr, Na, Bi and Ti, the molar ratio β of Sr with respect to Na had the values shown in table 1, auxiliary components of the type and amounts shown in table 1 were contained therein, and the baked dielectric composition had a perovskite crystal structure.

The weighed starting material powders were wet-mixed by means of a ball mill to obtain mixtures. The resulting mixtures were calcined for 2 hours under the air at 850° C. to obtain calcined material. The calcined material was then wet-ground using a ball mill to obtain calcined powders. 1 wt % of polyvinyl alcohol (PVA) was then added with respect to 100 wt % of the calcined powders. The calcined powders to which PVA had been added were then moulded under a pressure of about 196-490 MPa and square plate-shaped moulded articles having a planar length dimension of around 20 mm, a width of around 20 mm and a thickness of around 1 mm were obtained.

The square plate-shaped moulded articles were then baked to obtain dielectric composition samples. The baking conditions during this baking were as follows: the baking was performed under the air, the baking temperature was appropriately adjusted in the range of 950-1400° C., and the baking time was appropriately adjusted in the range of 2-10 hours, in the dielectric composition samples had the values shown in table 1, and the relative density of the dielectric composition samples was 95% or greater.

When the density of the dielectric composition samples was measured, it was found that the density of the dielectric composition samples in all of the exemplary embodiments and comparative examples was 95% or greater with respect to the theoretical density. That is to say, the relative density of all the dielectric composition samples was 95% or greater in all of the exemplary embodiments and comparative examples.

The make-up of the dielectric composition samples was analysed by means of X-ray fluorescence analysis. It was confirmed as a result that the contents of auxiliary components were the values shown in table 1, taking the contents of β and Ti in each sample as 100 molar parts.

The dielectric composition samples were formed into thin sheets by means of polishing, and lastly observation locations were cut into flakes by means of a gallium ion beam. The observation locations were then observed by means of scanning transmission electron microscopy (STEM). In addition, energy dispersive X-ray spectroscopy (EDS) was performed in the same observation field, and the element distribution was confirmed. The size of the observation field in STEM and EDS was 5 μm×5 μm and the magnification of the observation field was 40 000 times. Furthermore, a plurality of observation fields was set.

100 particles which could be confirmed as being completely surrounded by the grain boundary were selected from the plurality of observation fields. The number of core-shell particles among these having at least one core portion including $SrTiO_3$ (specific particles) was counted, the ratio α of the specific particles was calculated by means of the following formula (1), and it was confirmed that the value of a for each sample was the value in table 1.

$$\alpha = (\text{number of specific particles})/100 \qquad \text{Formula (1)}$$

The dielectric composition samples were machined using a double-sided lapping machine and a dicing saw, and machined samples having a length of 6 mm, a width of 6 mm and a thickness of 0.2 mm were obtained.

Ag electrodes were vapour-deposited on both surfaces of the resulting machined samples to produce samples for evaluation. The dielectric constant ε1 and the dielectric constant ε2 were measured for the samples for evaluation. The DC bias characteristics were further calculated from ε1 and ε2.

The dielectric constant ε1 (no units) was calculated from the capacitance measured from conditions of room temperature at 25° C., frequency 1 kHz, and input signal level (measurement voltage) 1.0 Vrms using a digital LCR meter (Hewlett-Packard; 4284A).

The dielectric constant ε2 (no units) was calculated from the capacitance measured from conditions of room temperature at 25° C., frequency 1 kHz, and input signal level (measurement voltage) 1.0 Vrms, surface area of facing electrodes, and interlayer distance while a DC bias generator (GLASSMAN HIGH VOLTAGE; WX10P90) was connected to a digital LCR meter (Hewlett-Packard; 4284A) and a DC bias of 5 V/μm was applied to the samples for evaluation. A value of 1300 or greater for the dielectric constant ε2 was deemed to be good in the present exemplary embodiments.

The DC bias characteristics were calculated using the following formula (2) from the dielectric constant ε1 and the dielectric constant ε2. In the exemplary embodiments, a DC bias within ±20% was deemed to be good.

DC bias characteristics (%)=100×(ε2−ε1)/1    Formula (2)

In addition, the abovementioned dielectric composition samples were processed to a length of 7.2 mm, a width of 2.5 mm and a thickness of 0.32 mm using a double-sided lapping machine and a dicing saw, whereby samples for transverse rupture strength measurement were produced. 20 samples for transverse rupture strength measurement were produced for each exemplary embodiment (comparative example).

The transverse rupture strength was calculated from the samples for transverse rupture strength measurement.

Specifically, the maximum load when the samples for transverse rupture strength measurement were broken by three-point bending by means of machine model 5543 produced by INSTRON with a distance between support points of 5 mm was measured. The maximum load was measured 20 times for each exemplary embodiment (comparative example) and the transverse rupture strength was calculated from the measurement results. A transverse rupture strength of 180 MPa or greater was deemed to be good in the present exemplary embodiments.

TABLE 1

| Sample no. | Core-shell particle ratio α | Auxiliary component Type | Auxiliary component Amount (molar parts) | Molar ratio β of Sr with respect to Na | Dielectric constant ε1 | Dielectric constant ε2 | DC bias characteristics (%), application of 5 V/μm | Transverse rupture strength (MPa) |
|---|---|---|---|---|---|---|---|---|
| Exemplary Embodiment 1 | 0.20 | La | 3.3 | 0.50 | 1783 | 1895 | 6.3 | 185 |
| Exemplary Embodiment 2 | 0.25 | La | 3.3 | 0.92 | 2263 | 2076 | −8.3 | 215 |
| Exemplary Embodiment 3 | 0.37 | La | 3.3 | 1.45 | 2210 | 1954 | −11.6 | 232 |
| Exemplary Embodiment 4 | 0.32 | La | 1.3 | 2.00 | 3050 | 2612 | −14.4 | 275 |
| Exemplary Embodiment 5 | 0.57 | La | 3.3 | 2.00 | 2448 | 2307 | −5.8 | 261 |
| Exemplary Embodiment 6 | 0.66 | La | 3.3 | 3.00 | 2022 | 1859 | −8.1 | 274 |
| Exemplary Embodiment 7 | 0.70 | La | 3.3 | 4.33 | 1430 | 1332 | −6.9 | 270 |
| Exemplary Embodiment 8 | 0.45 | Sm | 3.3 | 2.00 | 2125 | 2040 | −4.0 | 240 |
| Exemplary Embodiment 9 | 0.53 | Nd | 3.3 | 2.00 | 2280 | 2165 | −5.0 | 238 |
| Exemplary Embodiment 10 | 0.41 | Gd | 3.3 | 2.00 | 2240 | 2065 | −7.8 | 250 |
| Exemplary Embodiment 11 | 0.21 | Mg | 0.2 | 2.00 | 3545 | 3058 | −13.7 | 260 |
| Exemplary Embodiment 12 | 0.24 | Mg | 0.5 | 2.00 | 3456 | 2960 | −14.4 | 264 |
| Exemplary Embodiment 13 | 0.28 | Mg | 1.0 | 2.00 | 3090 | 2915 | −5.7 | 243 |
| Exemplary Embodiment 14 | 0.41 | Mg | 2.5 | 2.00 | 2700 | 2980 | 10.4 | 226 |
| Exemplary Embodiment 15 | 0.54 | Mg | 5.0 | 2.00 | 2374 | 2664 | 12.2 | 230 |
| Exemplary Embodiment 16 | 0.43 | Mg | 8.1 | 2.00 | 2060 | 2203 | 6.9 | 225 |
| Exemplary Embodiment 17 | 0.23 | Mg | 11.1 | 2.00 | 1796 | 1817 | 1.2 | 210 |
| Exemplary Embodiment 18 | 0.25 | Mg | 14.3 | 2.00 | 1680 | 1550 | −7.7 | 205 |
| Exemplary Embodiment 19 | 0.39 | Zn | 2.6 | 2.22 | 2230 | 1910 | −14.3 | 260 |
| Exemplary Embodiment 20 | 0.41 | Zn | 5.2 | 2.50 | 2118 | 1854 | −12.5 | 263 |
| Exemplary Embodiment 21 | 0.44 | Zn | 8.1 | 2.86 | 1545 | 1520 | −1.6 | 274 |
| Exemplary Embodiment 22 | 0.30 | Ba | 10.0 | 1.60 | 1912 | 1745 | −8.7 | 209 |
| Exemplary Embodiment 23 | 0.26 | Ca | 10.0 | 1.60 | 1880 | 1608 | −14.5 | 215 |
| Comparative Example 1 | 0.10 | none | 0.0 | 2.00 | 4625 | 2388 | −48.4 | 163 |
| Comparative Example 2 | 0.04 | none | 0.0 | 0.11 | 870 | 450 | −48.3 | 182 |
| Comparative Example 3 | 0.76 | La | 3.3 | 6.00 | 1150 | 1090 | −5.2 | 275 |
| Comparative Example 4 | 0.83 | La | 3.3 | 8.00 | 1025 | 1011 | −1.4 | 289 |
| Comparative Example 5 | 0.05 | La | 3.3 | 0.50 | 1783 | 1980 | 11.0 | 160 |
| Comparative Example 6 | 0.11 | La | 3.3 | 0.86 | 2263 | 2300 | 1.6 | 160 |
| Comparative Example 7 | 0.00 | La | 3.3 | 0.24 | 1640 | 765 | −53.4 | 140 |
| Comparative Example 8 | 0.00 | La | 3.3 | 0.38 | 1610 | 1250 | −22.4 | 142 |
| Comparative Example 9 | 0.05 | La | 3.3 | 0.11 | 1027 | 892 | −13.1 | 179 |
| Comparative Example 10 | 0.00 | Ba | 10.0 | 0.00 | 1510 | 610 | −59.6 | 165 |

It can be seen from table 1 that the dielectric compositions according to Exemplary Embodiments 1-23 in which the ratio α of specific particles satisfied 0.20≤α≤0.70 exhibited a dielectric constant ε2 of 1300 or greater, DC bias characteristics within ±20%, and a transverse rupture strength of 180 MPa or greater.

Furthermore, the dielectric compositions according to Exemplary Embodiments 1-6 and 8-23 in which the auxiliary component content was between 0.2 molar parts and 14.3 molar parts, taking the Ti content of the dielectric composition as 100 molar parts, and in which β≤3.00, exhibited a dielectric constant ε2 of 1500 or greater, DC bias characteristics within ±15%, and a transverse rupture strength of 180 MPa or greater.

It should be noted that the dielectric constants ε1, ε2 in Exemplary Embodiment 7 in which the auxiliary component content was between 0.2 molar parts and 14.3 molar parts, taking the Ti content of the dielectric composition as 100 molar parts, but β>3.00 were lower than in Exemplary Embodiments 1-6 and 8-23, and ε2 was less than 1500.

In addition, the dielectric compositions according to Exemplary Embodiments 2-6 and 8-23 in which the auxiliary component content was between 0.2 molar parts and 14.3 molar parts, with respect to 1 molar part of the dielectric composition, and in which the molar ratio β of Sr with respect to Na satisfied 0.92≤β≤3.00, exhibited a dielectric constant ε2 of 1500 or greater when a DC bias of 5 kV/mm was applied, DC bias characteristics within ±15%, and a transverse rupture strength of 200 MPa or greater.

In contrast to this, the dielectric compositions according to Comparative Examples 1-10 in which the ratio α of specific particles did not satisfy 0.20≤α≤0.70 exhibited results such that at least one of the dielectric constant ε2, the DC bias characteristics and the transverse rupture strength were unfavourable.

The invention claimed is:

1. A dielectric composition comprising:
   a perovskite crystal structure containing at least Bi, Na, Sr and Ti;
   at least one element selected from the group consisting of La, Ce, Pr, Nd, Sm, Eu, Gd, Tb, Dy, Ho, Yb, Ba, Ca, Mg and Zn; and
   specific particles having a core-shell structure that has at least one core portion including $SrTiO_3$,
   wherein 0.20≤α0.70, where a is a ratio of a number of specific particles with respect to a total number of particles contained in the dielectric composition, and
   wherein 0.92≤β≤3.00, where β is a molar ratio of Sr with respect to Na in the dielectric composition.

2. The dielectric composition according to claim 1, wherein a content of the at least one element is between 0.2 and 14.3 molar parts, taking a Ti content of the dielectric composition as 100 molar parts.

3. A dielectric element comprising the dielectric composition according to claim 1.

4. An electronic component comprising:
   a dielectric layer comprising the dielectric composition according to claim 1.

5. A laminated electronic component comprising:
   a laminated portion formed by alternately laminating an internal electrode layer and a dielectric layer comprising the dielectric composition according to claim 1.

6. A laminated ceramic capacitor comprising:
   the laminated electronic component according to claim 5, wherein the internal electrode layers are stacked such that end surfaces thereof are alternately exposed at surfaces of two opposing ends of the laminated electronic component.

7. The laminated ceramic capacitor according to claim 6, wherein the internal electrode layers comprise Cu.

8. The laminated ceramic capacitor according to claim 6, wherein the internal electrode layers comprise Cu alloy.

9. The laminated ceramic capacitor according to claim 6, further comprising a pair of terminal electrodes located at both ends of the laminated electronic component and being connected to the exposed end surfaces of the internal electrode layers.

10. The Laminated ceramic capacitor according to claim 9, wherein the terminal electrodes comprise Cu.

11. A single-layer ceramic capacitor comprising:
    a disc-shaped dielectric body comprising the dielectric composition according to claim 1; and
    a pair of electrodes being located on both surfaces of the dielectric body.

12. The single-layer ceramic capacitor according to claim 11, wherein a material of the electrodes comprises Cu.

13. A method for providing a dielectric composition, the method comprising:
    providing starting material powders of bismuth oxide ($Bi_2O_3$), sodium carbonate ($Na_2CO_3$), strontium carbonate ($SrCO_3$) and titanium dioxide ($TiO_2$), wherein the starting material powders are weighed out such that the dielectric composition has a perovskite crystal structure containing at least Bi, Na, Sr and Ti, at least one element selected from the group consisting of La, Ce, Pr, Nd, Sm, Eu, Gd, Tb, Dy, Ho, Yb, Ba, Ca, Mg and Zn, and specific particles having a core-shell structure that has at least one core portion including $SrTiO_3$, and wherein 0.20≤α≤0.70, where a is a ratio of a number of specific particles with respect to a total number of particles contained in the dielectric composition, and wherein 0.92≤β≤3.00, where β is a molar ratio of Sr with respect to Na in the dielectric composition;
    wet-mixing the weighed starting material powders;
    obtaining a calcined powder by calcining the mixture;
    adding a binder to the calcined powder thereby forming a paste;
    moulding the paste thereby forming a moulded article; and
    baking the moulded article.

* * * * *